(12) United States Patent
Behagel et al.

(10) Patent No.: US 9,065,347 B2
(45) Date of Patent: Jun. 23, 2015

(54) CONTROLLER FOR A SWITCHED MODE POWER SUPPLY

(71) Applicant: NXP B. V., Eindhoven (NL)

(72) Inventors: Frank Paul Behagel, Nijmegen (NL); Jeroen Kleinpenning, Lent (NL); Hans Halberstadt, Groesbeek (NL)

(73) Assignee: NXP B.V., Eindhoven (NL)

( * ) Notice: Subject to any disclaimer, the term of this patent is extended or adjusted under 35 U.S.C. 154(b) by 389 days.

(21) Appl. No.: 13/624,995

(22) Filed: Sep. 24, 2012

(65) Prior Publication Data

US 2013/0077354 A1  Mar. 28, 2013

(30) Foreign Application Priority Data

Sep. 22, 2011  (EP) ..................................... 11250817

(51) Int. Cl.
  *H02M 3/335* (2006.01)
(52) U.S. Cl.
  CPC .................................. *H02M 3/33523* (2013.01)
(58) Field of Classification Search
  CPC ............ H02M 3/335; H02M 3/33507; H02M 3/33523; H02M 2001/0032
  USPC ....................... 363/21.12, 21.13, 21.15, 21.16
  See application file for complete search history.

(56) References Cited

U.S. PATENT DOCUMENTS

| | | | |
|---|---|---|---|
| 6,862,198 B2 | 3/2005 | Muegee et al. | |
| 7,259,972 B2 * | 8/2007 | Yang | 363/21.16 |
| 7,352,595 B2 * | 4/2008 | Yang et al. | 363/21.13 |
| 7,362,592 B2 | 4/2008 | Yang et al. | |
| 7,447,049 B2 | 11/2008 | Garner et al. | |
| 7,764,520 B2 | 7/2010 | Djenguerian et al. | |
| 8,237,415 B2 | 8/2012 | Iwasaki et al. | |
| 8,391,028 B2 * | 3/2013 | Yeh | 363/21.05 |
| 2005/0073862 A1 | 4/2005 | Mednik et al. | |
| 2006/0284567 A1 | 12/2006 | Huynh et al. | |
| 2008/0043496 A1 | 2/2008 | Yang | |
| 2009/0073727 A1 | 3/2009 | Huynh et al. | |
| 2009/0102435 A1 | 4/2009 | Iwasaki et al. | |
| 2009/0175057 A1 | 7/2009 | Grande et al. | |

FOREIGN PATENT DOCUMENTS

| | | |
|---|---|---|
| CN | 101420179 A | 4/2009 |
| WO | 2004/051834 A1 | 6/2004 |

OTHER PUBLICATIONS

Extended European Search Report for European Appln. No. 11250817.1 (Aug. 20, 2012).

* cited by examiner

*Primary Examiner* — Adolf Berhane
*Assistant Examiner* — Yemane Mehari

(57) ABSTRACT

A controller for a switched mode power supply, the switched mode power supply comprising one or more windings. The controller comprising a fixed speed timer; a threshold setter configured to set a threshold for the timer in accordance with a peak value of a current through one of the one or more windings; a secondary stroke detector configured to start the fixed speed timer upon detection of the start of a secondary stroke of the switched mode power supply; a sampler configured to sample a voltage across one of the one or more windings when a count of the fixed speed timer reaches the threshold.

15 Claims, 10 Drawing Sheets

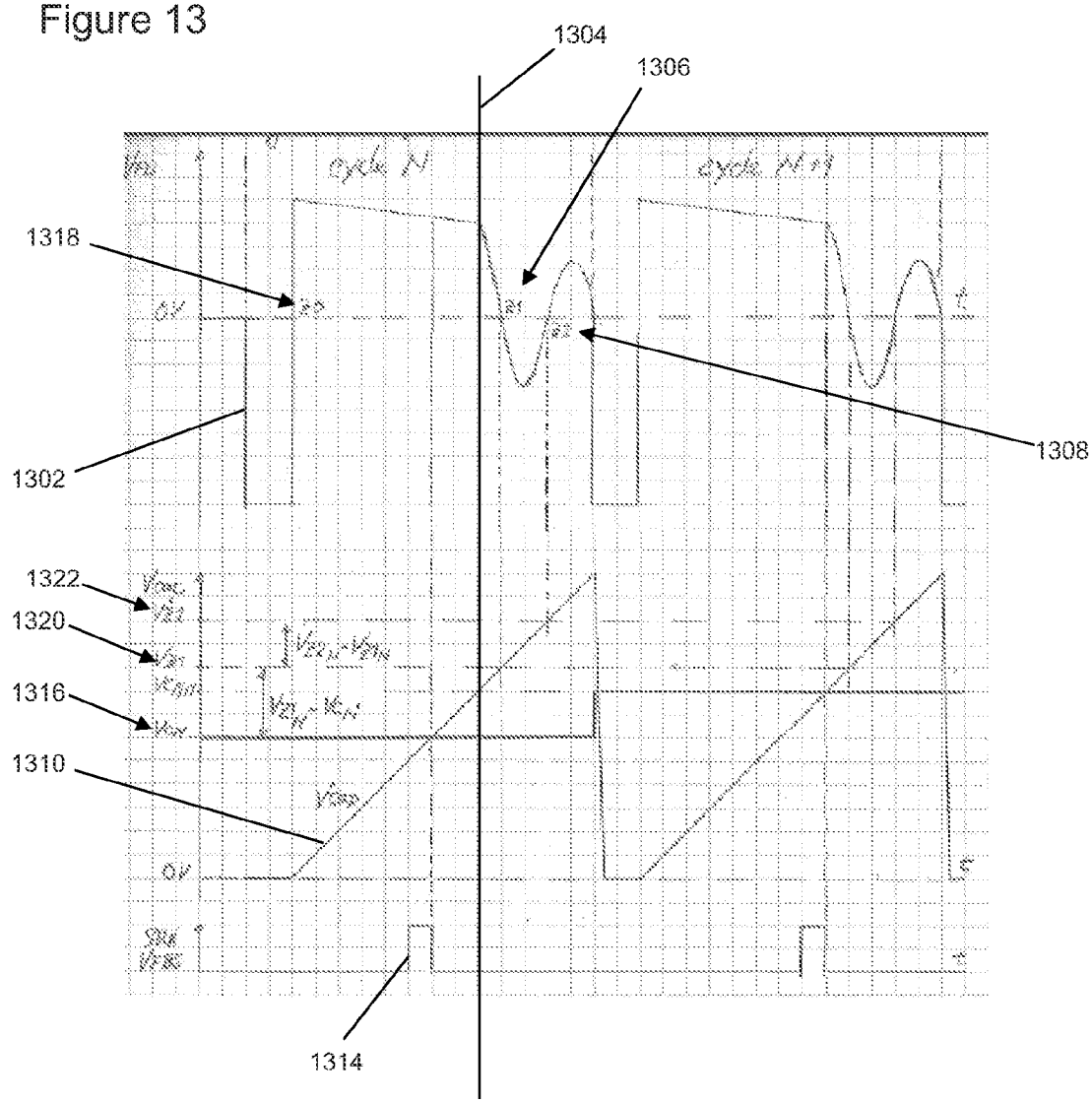

ic application no. 11250817.1, filed on Sep. 22, 2011, the contents of which are incorporated by reference herein.

CONTROLLER FOR A SWITCHED MODE POWER SUPPLY

CROSS-REFERENCE TO RELATED APPLICATIONS

This application claims the priority under 35 U.S.C. §119 of European patent application no. 11250817.1, filed on Sep. 22, 2011, the contents of which are incorporated by reference herein.

The present disclosure relates to the field of controllers for switched mode power supplies, and in particular, although not exclusively, to controllers for sampling a voltage across a winding of the switched mode power supply.

Switched mode power supplies (SMPS) with mains isolation and control at the primary side are known. With such SMPSs it is necessary to sense the output variable to be regulated, for example output voltage, in order to regulate it to a desired level. This regulation is often done by sensing the output voltage, comparing it with a reference value at the secondary side and sending only the error signal to the primary side. Often an opto-coupler is used to send the error signal over the mains isolation for example from the secondary side to the primary side of a transformer in a flyback converter. An opto-coupler can be too expensive for some requirements, for example in the low power adapter market. Furthermore, an opto-coupler consumes power both at the secondary side and at the primary side and therefore increases the power that is consumed in normal operation (with a load) and at no-load conditions. This additional power consumption can make it difficult to meet some requirements, such as the Energy Star specification.

It is known that a good moment for sampling is at the end-of-conduction of a secondary stroke of a switched mode power supply. The conduction is related to the current through the secondary winding and the secondary diode of a flyback converter.

According to a first aspect of the invention, there is provided a controller for a switched mode power supply, the switched mode power supply comprising one or more windings, the controller comprising:
  a fixed speed timer;
  a threshold setter configured to a set a threshold for the timer in accordance with a peak value of a current through one of the one or more windings;
  a secondary stroke detector configured to start the fixed speed timer upon detection of the start of a secondary stroke of the switched mode power supply;
  a sampler configured to sample a voltage across one of the one or more windings when a count of the fixed speed timer reaches the threshold.

Such a controller can enable the voltage across the winding to be measured at a moment where the difference between the winding voltage and the output voltage is relatively small (which may take into account the scaling factor due to the turns ratio between two windings) as the threshold for the timer is set in accordance with the peak value of a current through the winding, which enables the threshold to be automatically adjusted in line with the current in the winding of the switched mode power supply (SMPS). Therefore, the output voltage of the SMPS can be determined more accurately, especially as the winding voltage can be sampled close to the end of conduction of the secondary stroke for a range of output voltages. In turn, this can enable the SMPS to have a more accurate output voltage.

The fixed speed timer may be a timer where the variation of the timer output is proportional to time with a fixed factor. That is, the count of the timer may have a fixed counting speed with respect to time.

In embodiments where the SMPS is a flyback converter, the threshold setter may be configured to a set the threshold for the timer in accordance with a peak value of a current through the primary winding. The sampler may be configured to sample a voltage across an auxiliary winding when the count of the fixed speed timer reaches the threshold. In some examples, the flyback converter may have two auxiliary windings: one for supplying voltage to the controller IC, and one for sensing/sampling.

The secondary stroke detector may be configured to start the fixed speed timer in response to detection of the power switch (212) of the switched mode power supply being turned off. This can provide a convenient and relatively simple implementation for starting the fixed speed timer.

The controller may be further configured to:
  determine the length of the secondary stroke;
  determine a sampling moment as the instant that the sampler samples the voltage across the winding when the threshold is reached;
  wherein the threshold setter is configured to modify the threshold for use in a subsequent switching cycle of the switched mode power supply in accordance with the sampling moment and the length of the secondary stroke.

The length of the secondary stroke may also be known as the duration of the conduction of the secondary diode.

Modifying the threshold in this way can provide adaptive compensation to account for any discrepancies between the sampling moment and the end of the secondary stroke as determined for an earlier switching cycle. In some examples, an initial switching cycle will have an early sampling for guaranteed sampling in the secondary stroke. This adaptive compensation can improve the performance of the controller as it enables sampling to occur closer to the end-of-conduction of the secondary stroke based on previous switching cycles.

The controller may be further configured to determine the length of the secondary stroke using one or more features of ringing in a voltage at the winding that follows the secondary stroke. In this way, periodic characteristics in the ringing can be used to identify the end of the secondary stroke. In some examples, periodic characteristics of the initial switching cycle are used as initial periodic characteristics for subsequent switching cycles.

The controller may be further configured to identify instants in time when a derivative of the voltage across the winding with respect to time is zero, and determine the end of the secondary stroke using the identified instants in time. These instants in time may be referred to as zero derivative instants.

In addition, or alternatively, the controller may be configured to identify instants in time when the voltage at the winding crosses zero, and determine the end of the secondary stroke using the identified instants in time. These instants in time may be referred to as zero value instants.

The controller may be further configured to modify the threshold for use in a subsequent switching cycle in accordance with the ratio between the length of the secondary stroke and the time between start of secondary stroke and the sampling moment. The controller may be configured to multiply the threshold for the actual switching cycle by the ratio of the previous cycle in order to determine the adapted threshold for a current switching cycle. This may be considered as providing multiplicative adaptation of the threshold, and can be advantageous for steady state and transient operation whereby the output voltage of the SMPS significantly varies over time.

The controller may be further configured to modify the threshold for use in a subsequent switching cycle in accordance with the difference between the length of the secondary stroke and the time between start of secondary stroke and the sampling moment. The controller may be configured to add the difference to the threshold from a previous switching cycle in order to determine the threshold for a current switching cycle. This may be considered as providing additive adaptation of the threshold, and can be advantageous for steady state operation whereby the load current and input voltage of the SMPS does not significantly vary over time. Additive adaption can depend on the operating point. The additive system can at least partly react on a transient and can also provide advantages for transient operation, although a residual error may remain in the sampling moment, depending on the transient and the transient speed.

The secondary stroke detector may be configured to compare a signal representative of a voltage across the winding with a secondary stroke threshold voltage in order to detect the start of the secondary stroke. The secondary stroke threshold voltage may have a low value. The secondary stroke threshold may be about zero volts, and may be greater than zero volts. This can provide an effective way of starting the fixed speed timer at the start of the secondary stroke as opposed to the instant that the power switch of the SMPS is operated.

The controller may be further configured to control operation of a switch of the switched mode power supply in accordance with the sampled voltage.

The controller may further comprise a frequency regulator configured to control the frequency of operation of the switch of the SMPS in accordance with the sampled voltage.

The controller may further comprise a period regulator configured to control the peak current of the switch in accordance with the sampled voltage.

There may be provided a switched mode power supply comprising the controller of any preceding claim.

According to a further aspect of the invention, there is provided a method of sampling a voltage across a winding in a switched mode power supply, the method comprising:
  setting a threshold in accordance with a peak value of a current through a winding of the switched mode power supply;
  detecting the start of a secondary stroke of the switched mode power supply;
  starting a fixed speed timer upon detection of the start of the secondary stroke; and
  sampling a voltage across the winding when a count of the timer reaches the threshold.

The method may further comprise controlling an operation of a switch of the switched mode power supply in accordance with the sampled voltage.

There may be provided an integrated circuit comprising any circuit disclosed herein.

There may be provided a computer program, which when run on a computer, causes the computer to configure any apparatus, including a circuit, integrated circuit, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device, or may be embodied as a transient signal. Such a transient signal may be a network download, including an internet download.

A description is now given, by way of example only, with reference to the accompanying drawings, in which.

Figure 6:
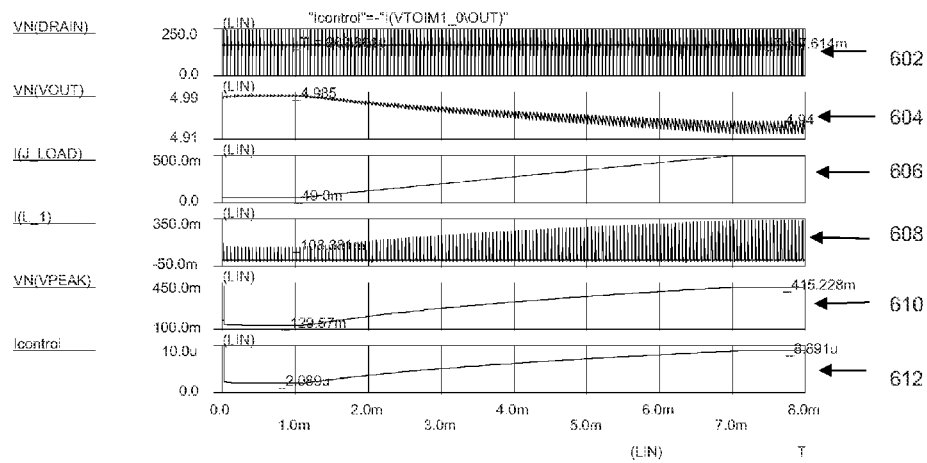
FIG. 6 illustrates example waveforms in a flyback converter that is controlled in accordance with an embodiment of the invention.
Figure 7:
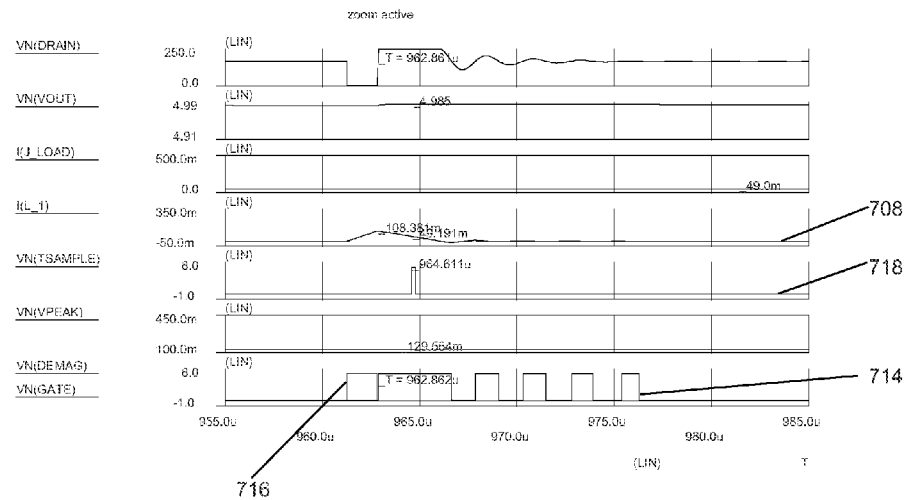
Figure 8:
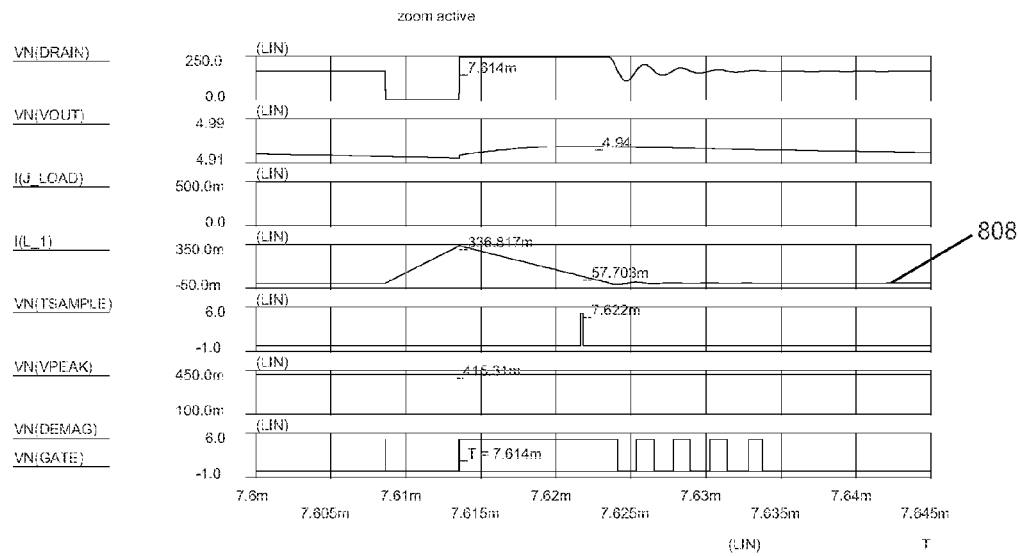
Figure 9:
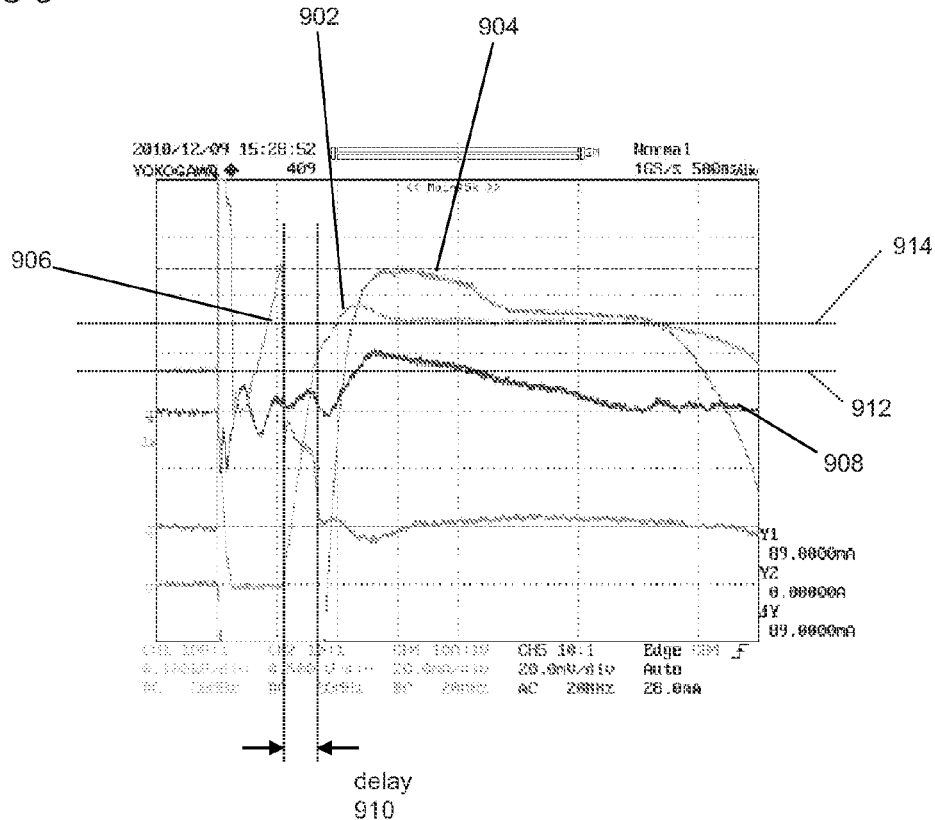
Figure 10:
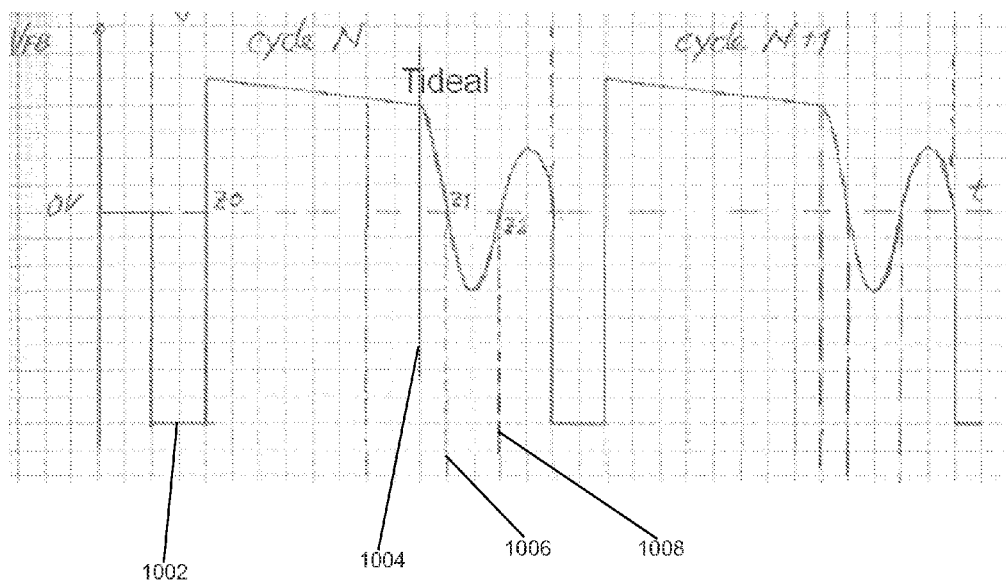
Figure 12:
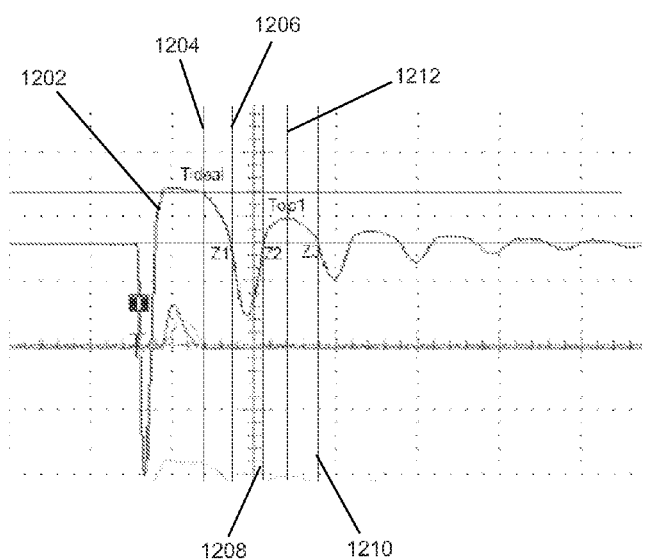
Figure 11:
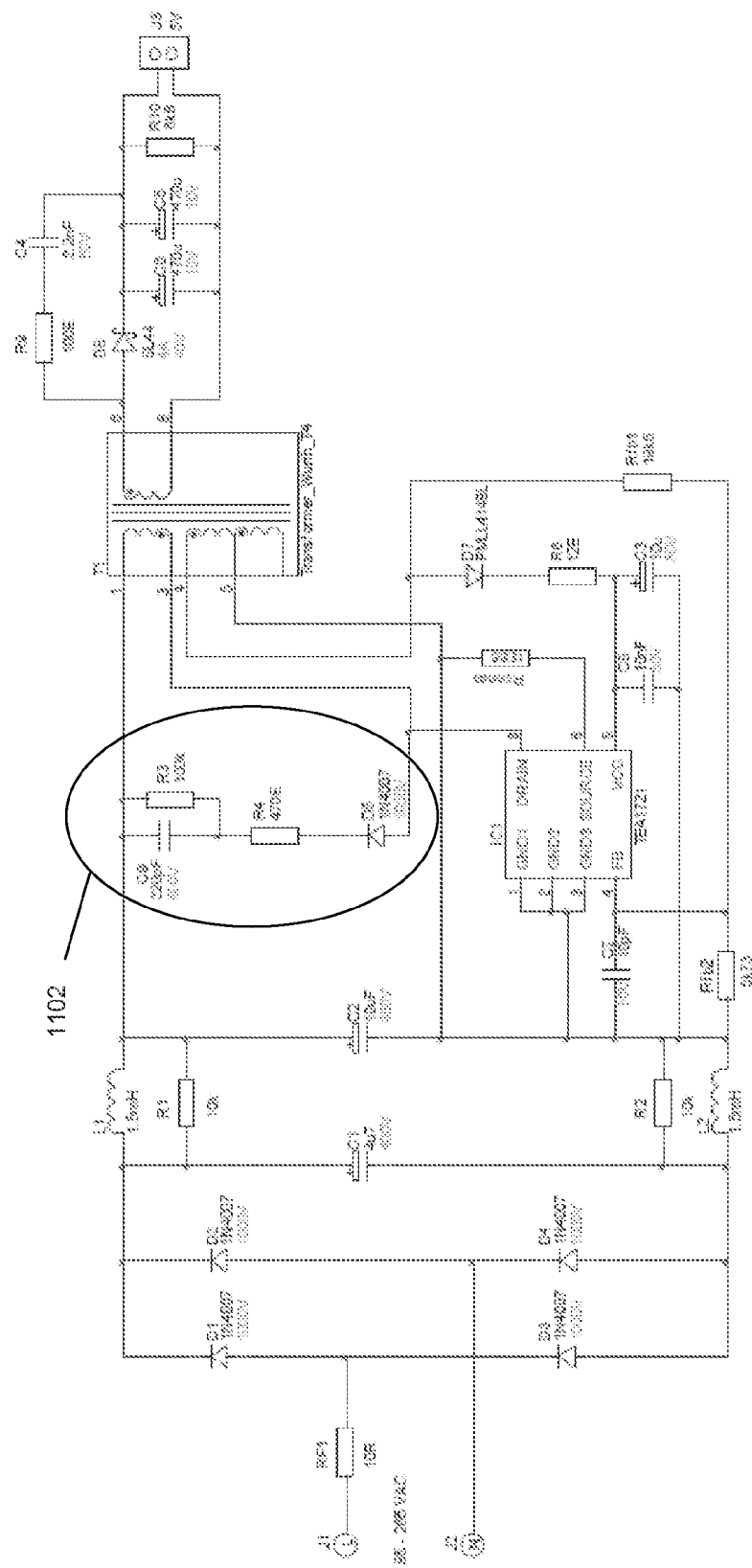
Figure 14:
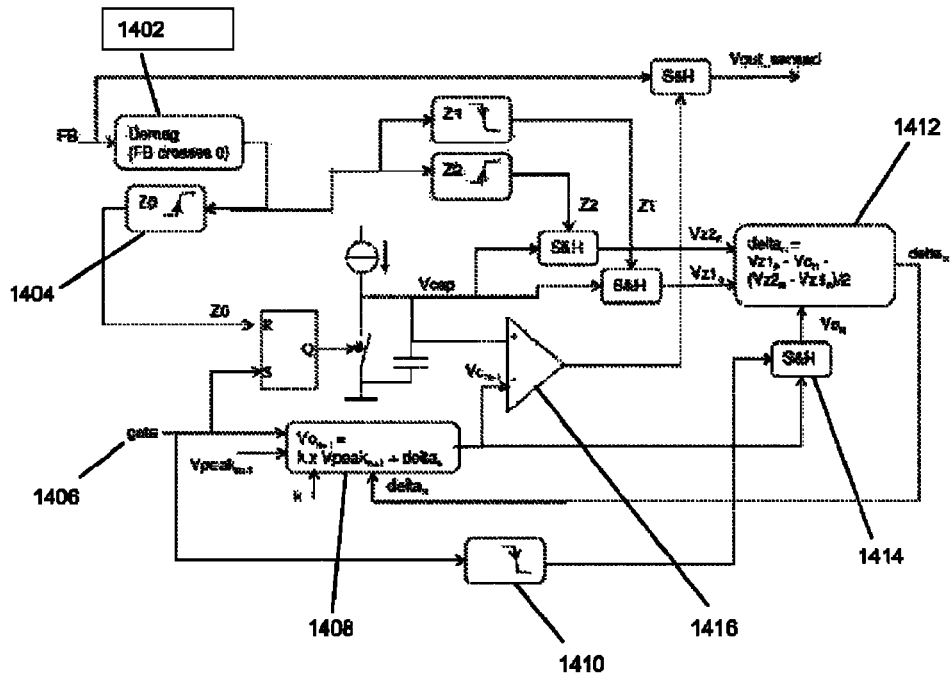
Figure 15:
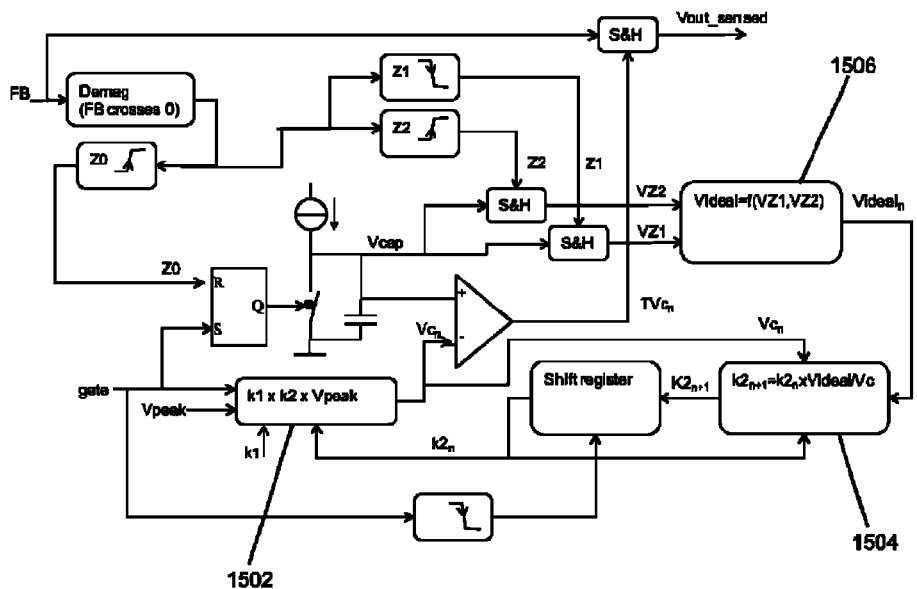
Figure 16:
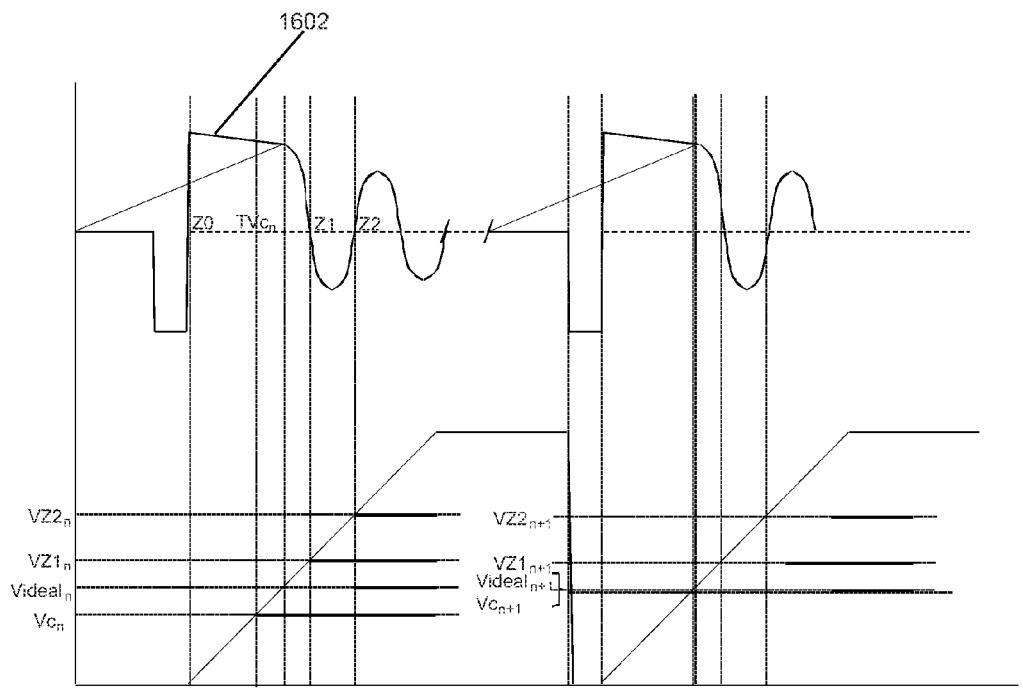

FIG. 7 provides a detailed view of the signals of FIG. 6 at times when the peak value of the magnetization current is low;

FIG. 8 provides a detailed view of the signals of FIG. 6 at times when the peak value of the magnetization current is high;

FIG. 9 shows graphically waveforms around the switch-off of the power switch in a flyback converter that is controlled in accordance with an embodiment of the invention;

FIG. 10 shows an example voltage waveform 1002 at an aux winding of a transformer in a flyback converter;

FIG. 11 illustrates an example of a prior art peak clamp circuit;

FIG. 12 illustrates the voltage waveform at a primary switching node of a flyback converter that includes a peak clamp circuit;

FIG. 13 illustrates example waveforms for controlling a flyback converter according to an embodiment of the invention;

FIG. 14 illustrates schematically an example block diagram for implementing a summation variant of an embodiment of the present invention;

FIG. 15 illustrates schematically an example block diagram for implementing a multiplication variant of an embodiment of the present invention;

FIG. 16 shows graphically waveforms at nodes in the circuit of FIG. 15; and

Figure 17:
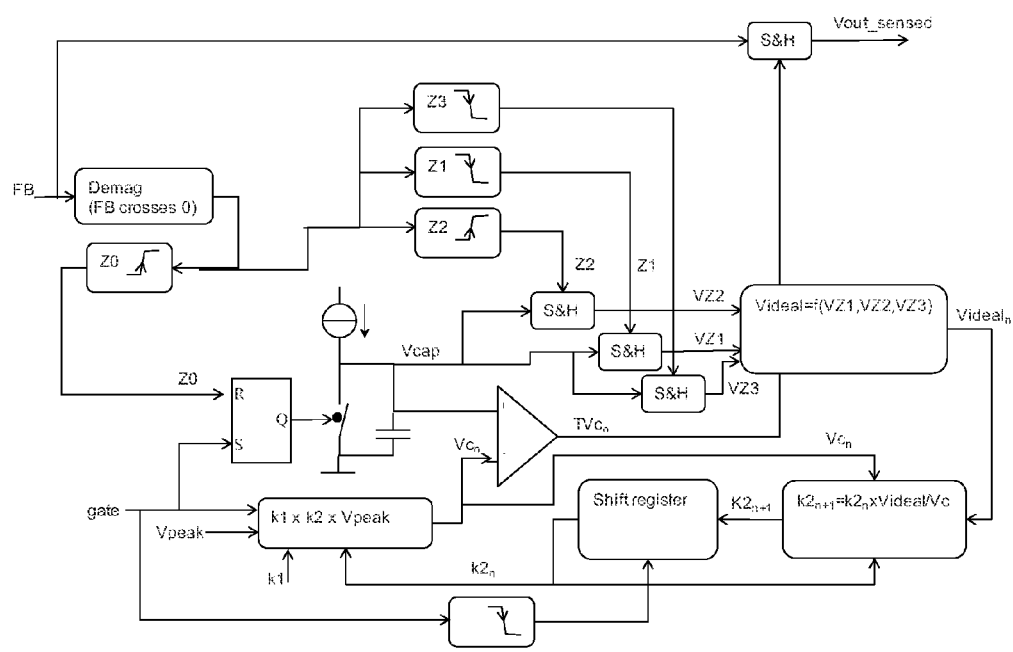

FIG. 17 illustrates schematically an example block diagram for implementing a multiplication variant of another embodiment of the present invention.

One or more embodiments disclosed herein relate to a controller for a switched mode power supply (SMPS) having a winding. The controller can have a secondary stroke detector configured to detect the start and end of a secondary stroke of the SMPS and the zero-crossings of the ringing of the SMPS (for discontinuous conduction mode operation). The controller can also include a fixed speed timer for counting from the start of a demagnetization period of the SMPS and a sampler for sampling a voltage within the SMPS when a count of the fixed speed timer reaches a threshold. The threshold can be set in accordance with a peak value of a current through the winding. The peak value of the current through the winding directly affects the length of the secondary stroke, and therefore also directly affects the ideal moment at which the voltage should be sampled. Therefore, setting the threshold in accordance with the peak value of the current through the winding enables the moment of sampling to be automatically adjusted, and the difference between the output voltage and the sampled voltage to be kept to a minimum, which may involve taking into account a scaling factor due to a turns ratio between two windings.

In some embodiments, the threshold can be adapted or modified in accordance with a determined length of the demagnetization period for a preceding switching cycle such that the sampling instant can be brought closer to the end of the demagnetization period.

Such a controller can enable the voltage across the winding to be measured at a moment where the difference between the winding voltage and the output voltage is at a minimum as the threshold for the timer is set in accordance with the peak value of a current through the winding, which enables the threshold to be automatically adjusted in line with the current in the transformer winding of the switched mode power supply (SMPS). Therefore, the output voltage of the SMPS can be determined more accurately, as the winding voltage can be sampled close to the end of the demagnetization period for a range of output voltages. In turn, this can enable the SMPS to have a more accurate output voltage.

Figure 1:
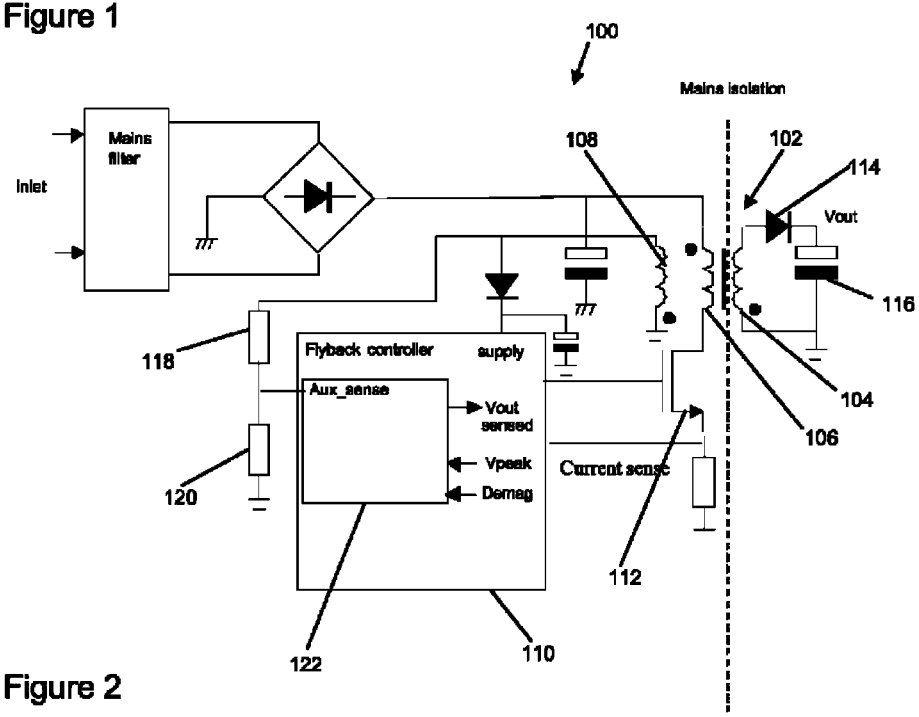
FIG. 1 illustrates a flyback converter.

FIG. 1 illustrates a flyback converter 100, which is one example of a switched mode power supply (SMPS), according to an embodiment of the invention. The flyback converter 100 includes a power switch 112 and a transformer having a primary winding 106, a secondary winding 104 and an auxiliary winding 108. The flyback converter 100 also includes a flyback controller 110 that generates a switch control signal for operating the switch 112 of the flyback converter 100. The flyback controller 110 may be a separate integrated circuit (IC). The auxiliary winding 108 is at the primary side of the transformer 102 and is used to provide a supply voltage to the flyback controller IC 110.

It is known that for flyback converters that regulate an output voltage, it is possible to use the voltage across the transformer windings 104, 108, 108 to sense the output voltage during a specific window, in this example, the voltage across the auxiliary winding 108 is provided as a feedback input to the flyback controller 100, via a resistive divider 118, 120. The sensed voltage (that is, the voltage that is sensed as being representative of the output voltage of the flyback converter 100) can be determined at the auxiliary winding 108 as the turns ratio of the auxiliary winding 108 with respect to the secondary winding 104 is known.

The flyback controller 110 includes a sensing circuit 122, which is referred to as aux_sense in FIG. 1. The sensing circuit 122 receives a demag input and a Vpeak input and provides a Vout sensed output. Further details of the sensing circuit are provided below with reference to FIG. 2.

There can be a difference between the actual output voltage and the voltage at the physical connection of the secondary transformer winding 104 which can lead to inaccuracies in the sensed output voltage and therefore inaccuracies in the control of the flyback converter. These inaccuracies can be caused by:
  The series impedance of the rectifier diode 114 at the secondary side of the transformer, which causes a voltage drop across the rectifier diode 114;
  The forward voltage drop across the rectifier diode 114 at the secondary side. This can have a strong dependence on current and temperature;
  The equivalent series resistance (ESR) of the output capacitor 116 (which may also be referred to as an output elcap), which causes a voltage (in addition to the DC voltage) drop across the output capacitor 116;
  Impedances inside the transformer 102, including leakage inductances to the auxiliary winding 108.

When a flyback converter is used in boundary conduction mode (BCM) or discontinuous conduction mode (DCM), the current in the secondary circuit is high at the start of the secondary stroke and a significant ringing is present. During the secondary stroke, the ringing damps out and the current gradually reduces to zero. When a current flows in the secondary circuit, and the auxiliary winding 108 is used to provide a supply voltage to the flyback controller 110, the measured voltage at the auxiliary winding 108 will be at a value between the (reflected) voltage of the secondary output and the supply voltage of the controller IC, depending on the leakage inductance network between the different windings, if the output voltage is sensed by measuring the voltage at the auxiliary winding at the start of the secondary stroke, it may be very inaccurate. This is because there is typically a significant amount of voltage ringing in the primary winding 106 and auxiliary winding 108 at the start of the secondary stroke, in addition, for converters that include a clamping circuit (described in more detail below with reference to FIG. 11) there can also be a clamping current which influences the voltage at the auxiliary winding 108 and therefore decreases the accuracy of the output voltage.

For at least the above reasons, it can be advantageous to measure the output voltage at a moment that the current in all other windings is zero. This is especially true at low load, when the output current and the current in the auxiliary winding 108 that is used to supply the flyback controller IC 110 can be at the same order of magnitude. The result is that the current in the auxiliary winding 108 that is used to supply the controller IC 110 flows during a larger part of the secondary stroke. This can give an undesired effect because current flows in the auxiliary winding when the output voltage is measured, and this auxiliary current influences the reflected output voltage that is measured from the auxiliary winding.

The power consumption of a SMPS at no-load of a low power adapter application is an issue that is becoming increasingly important. At the present time, no-load input power consumption levels of less than 30 mWatt are required to satisfy some standards. Sampling the output voltage (Vout) at the end of the secondary stroke may be advantageous for Vout accuracy at no load, and therefore can provide a reduction of input power consumption. Sensing Vout at the end of the secondary stroke can also be known as sampling at end of conduction. However, it can be very difficult in the prior art to detect the right moment for sampling.

Figure 2:
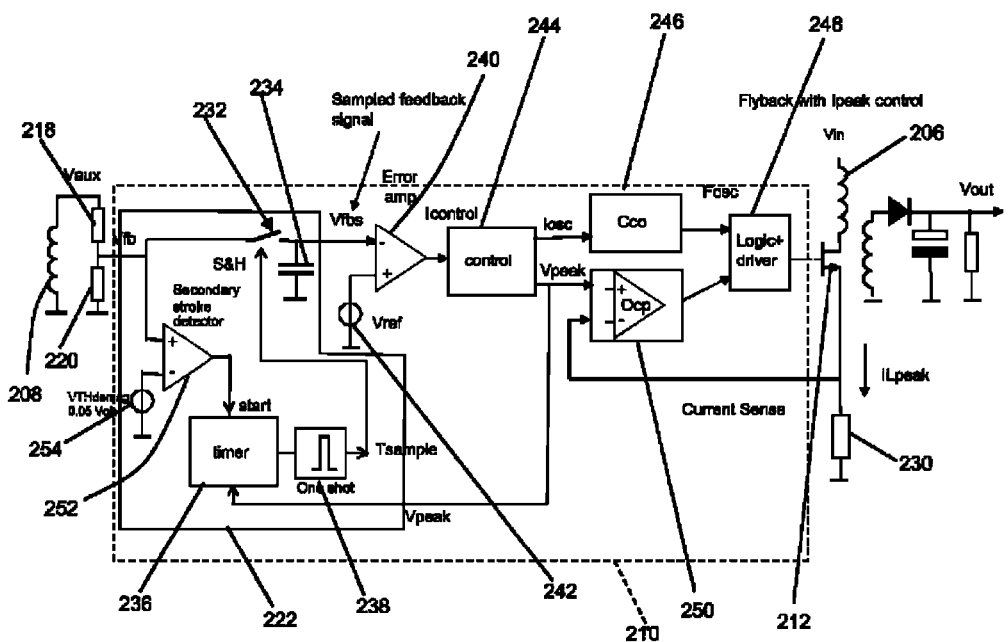
FIG. 2 illustrates a controller according to an embodiment of the invention.

FIG. 2 illustrates further details of the flyback controller 110, 210 of FIG. 1. The flyback controller 210 includes a sensing circuit 222. Also shown in FIG. 2 is the auxiliary winding 208 that is coupled to a resistive divider 218, 220. The node between the two resistors of the resistive divider 218, 220 is coupled to a Vfb input terminal of the controller 210. The output of the controller 210 is a switch control signal that operates the power switch 212 of the converter.

The power switch 212 of the converter is coupled in series between the primary winding 206 and a sense resistor 230. The node between the switch 212 and the sense resistor 230 is coupled to a current sense input terminal of the controller 210 in order to provide a signal representative of the peak current through the primary winding 208. As discussed in more detail below, use of the peak current value through the primary winding 206 by the controller 210 can provide an improved accuracy of the output voltage of flyback converter.

The sense circuit 222 consists of a sample and hold circuit, a secondary stroke detector and an adaptive timer. The sample and hold circuit may also be referred to as a sampler.

The sample and hold circuit comprises a switch 232 and a capacitor 234 and is configured to sample the Vfb signal across the capacitor 234 when the switch 232 is closed for a short period of time. The output of the sample and hold circuit is referred to as a sampled feedback voltage Vfbs.

The controller 210 also includes a secondary stroke detector 252, which in this example is a comparator. The secondary stroke detector 252 compares the feedback voltage Vfb with a fixed reference voltage, which may be referred to as secondary stroke threshold voltage. In this example the fixed reference voltage is 0.05 V and is provided by a DC voltage source 254. A fixed reference voltage of about 0 V is used as this represents the start of the secondary stroke of the flyback converter. In this example a fixed reference value of just above 0 V is used because a margin for offset and noise is needed. The output of the secondary stroke detector 252 is provided as a start input to a timer 236 of the adaptive timer, which may be a fixed speed timer.

In some circumstances the secondary stroke detector 252 may be referred to as a demagnetization detector, although this name is not strictly correct in some examples as the detector looks to an absolute voltage for detecting the zero-crossing. This is in principle not demagnetization because detecting Vp=0V (or nearly 0V) corresponds with dφ/dt=0 and not with φ=0.

The adaptive timer comprises the timer 236 and a pulse generator 238. The pulse generator 238 is configured to provide a pulse to the switch 232 of the sample and hold circuit when the timer 236 expires. The timer 236 has a start input and a Vpeak input. The Vpeak input receives a signal indicative of the peak current through the primary winding, it will be appreciated that the voltage across the sense resistor 230 is indicative of the current through the primary winding as V=IR. The timer 236 starts counting in accordance with a signal at the start input, and provides an output signal to the pulse generator 238 when the count reaches a threshold that is set in accordance with Vpeak. Further details of an implementation of the timer 236 are provided below with reference to FIG. 3

The controller 210 includes an error amplifier 240 that compares the sampled feedback voltage Vfbs (inverting input) with a reference voltage Vref (non-inverting input). The reference voltage Vref is represented by a DC voltage source 242 in FIG. 2 and has a value that corresponds to the desired output voltage level. The error amplifier 240 provides an error current output signal Icontrol, which is the input for a control block 244.

The control block 244 generates two output signals: a control current Iosc and a voltage level Vpeak. The control current Iosc is provided to a current controlled oscillator (CCO) 246. The CCO 248 generates a switching frequency Fosc output signal that is provided to a driver 248 and is used to set the switching frequency of operation of the power switch 212 of the flyback converter. The CCO may be referred to as a frequency-regulator that is configured to control the frequency of operation of the power switch 212 in accordance with the sampled voltage. The voltage level Vpeak is provided as an input to an over-current peak (OCP) comparator 250. The OCP comparator 250 compares Vpeak with the sensed peak voltage across the sense resistor 230. The OCP comparator 250 may be referred to as a period regulator that is configured to control the peak current of the power switch 212 in accordance with the sampled voltage, it will be appreciated that the sensed peak voltage across the sense resistor 230 is proportional to the peak current through the sense resistor 230. The output of the OCP comparator 250 is also provided to the driver 248 and is used to set the peak current through the primary winding 206 by controlling the voltage drop over the sense resistor 230 when the switch 212 is kept on.

The Vpeak output of the control block 244 is also used as an input for the sensing circuit 222, and more particularly the Vpeak output of the control block 244 is used as the Vpeak input for the timer 236.

In some embodiments, a low-pass filter (not shown) can be located between the error amplifier and the control block 244. The low-pass filter can be used to time average the Icontrol signal such that more steady control of the power switch 212 can be achieved.

Figure 3:
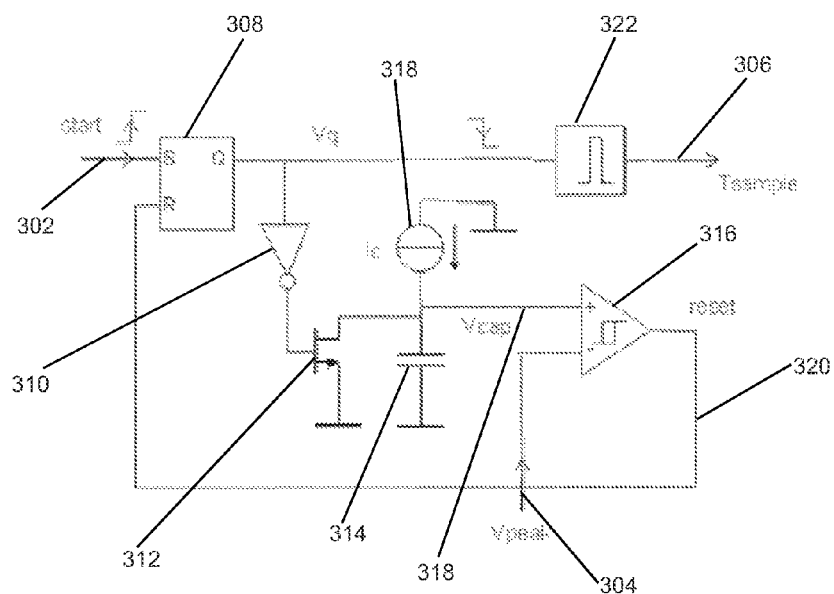
FIG. 3 shows a detailed view of the adaptive timer of FIG. 2.
Figure 4:
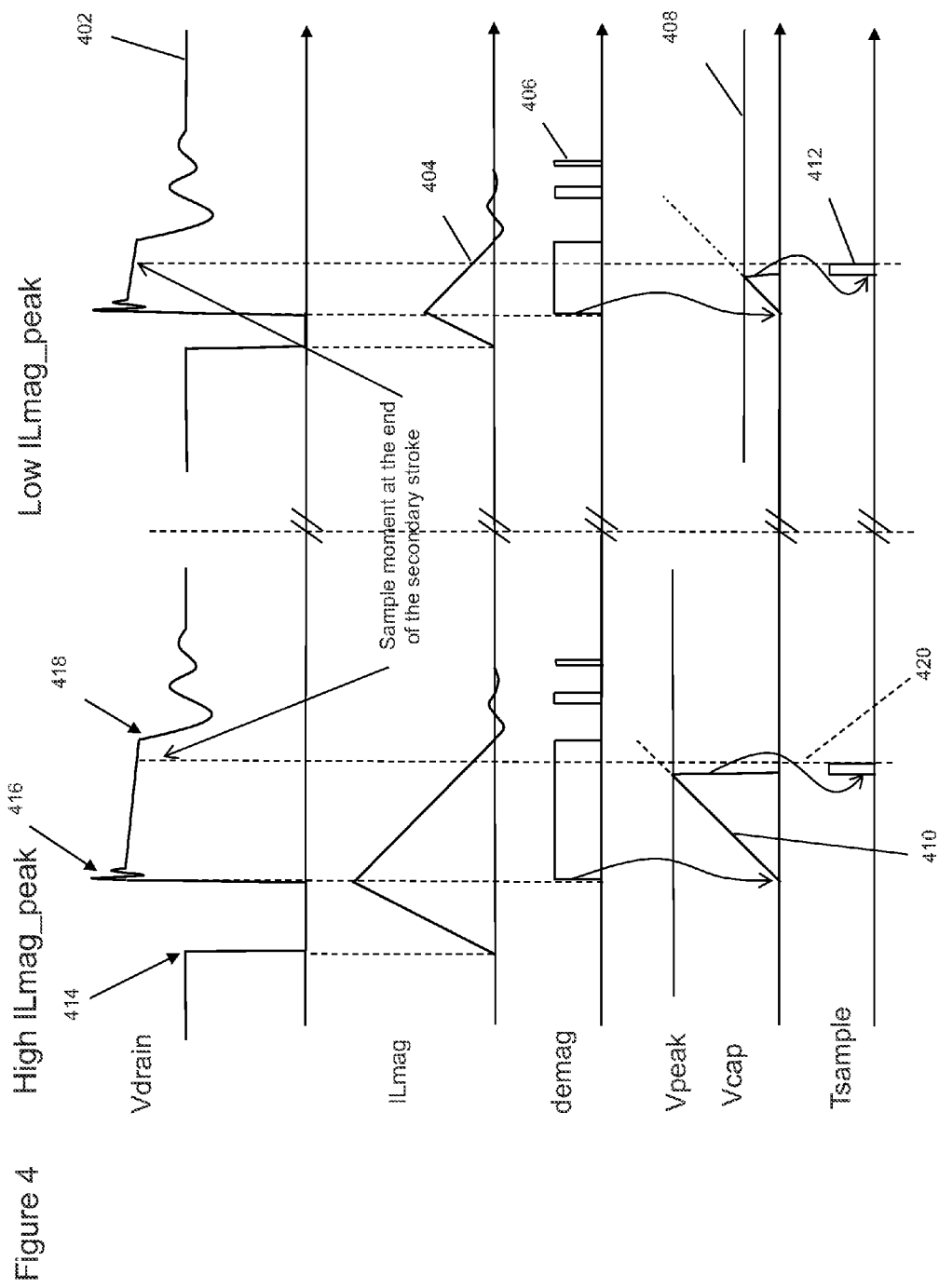
FIG. 4 illustrates graphically some of the signals that are present in the circuits of FIGS. 2 and 3.

FIG. 3 shows a detailed view of the adaptive timer of FIG. 2, and includes the functionality of both the timer 236 and pulse generator 238 of FIG. 2. FIG. 4 depicts some of the signals in the circuit of FIG. 3. FIG. 4 is described in more detail below.

The circuit of FIG. 3 receives a start input signal 302 from the secondary stroke comparator 252 of FIG. 2, and a Vpeak input 304 from the control block 244 of FIG. 2. The circuit provides a Tsample output 306 that is used to control the sample and hold switch 232 of FIG. 2. In FIG. 3 and FIG. 4 the sampling starts when Vcap crosses Vpeak and the sample is held and stored after a one-shot time of the sample pulse.

The start input signal 302 is provided to the set input of an SR flip-flop 308. When the start input signal 302 transitions from low to high, the Q output of the SR flip-flop 308 is set. The signal at the Q output of the SR flip-flop is identified as Vq in FIG. 3. Vq is provided to the input of a NOT gate 310. The output of the NOT gate 310 is provided to the gate of a MOST 312. The MOST 312 is one non-limiting example of a switch that can be used.

The source of the MOST 312 is coupled to ground. The drain of the MOST 312 is coupled to: a first plate of a timing capacitor 314; and a constant current source 318. The second plate of the timing capacitor 314 is coupled to ground. In this example, the constant current source has a fixed current value and is used to linearly increase the charge stored on the timing capacitor 314 when the conduction channel of the MOST 312 does not conduct, that is when the signal at the gate of the MOST 312 is low. When the conduction channel of the MOST 312 does conduct, that is when the signal at the gate of the MOST 312 is high, the timing capacitor 314 is discharged to ground via the MOST 312.

The first plate of the timing capacitor 314 is also coupled to a positive input of a timing comparator 316. The signal that is provided to the positive input of the timing comparator 316 is referred to as Vcap 318 as it is representative of the charge across the timing capacitor 314. It will be appreciated from the above description that the charge across the timing capacitor 314 represents the period of time since the start signal 302 has been received. The received Vpeak signal 304 is provided to the negative input of the timing comparator 316. In this way, the output of the timing comparator 316 transitions from low to high when the gradually increasing Vcap signal 318 exceeds the Vpeak signal 304. That is, a threshold is set for the timer in accordance with the value of Vpeak 304 and any one of the components of FIG. 2 that are involved in providing the Vpeak signal can be considered as a threshold setter. The output 320 of the timing comparator 316 is coupled to the reset input of the SR flip-flop 308. Therefore, the Q output Vq of the SR flip-flop 308 transitions from high to low upon expiry of a period of time that is associated with the peak current through the primary winding after the start of the secondary stroke of the converter.

In this example, the timing comparator 316 is a Schmitt trigger.

The Q output Vq of the SR flip-flop 308 is provided as an input to a pulse generator 322 that is configured to provide a pulse at its output Tsample 306 when Vq transitions from high to low. It is this pulse in the Tsample signal 306 that is used to identify the time at which the sensed voltage should be sampled.

FIG. 4 illustrates graphically some of the signals that are present in the circuits of FIGS. 2 and 3. Shown at the top of FIG. 4 is the Vdrain signal 402, which represents the voltage at the drain of the power switch 112 of FIG. 1. It will be appreciated that the Vfb signal provided as an input to the flyback controller will have the same shape as Vdrain 402, but with lower values and without the DC component of the input voltage such that the average value of Vfb is zero.

The second signal shown in FIG. 4 is ILmag 404 and represents the magnetization current of the transformer. The maximum value of ILmag 404 will be referred to as ILpeak and is equal to the peak value of the current in the primary winding.

The third signal in FIG. 4 is labelled demag 406 and represents the periods of time that the auxiliary winding has a reflected voltage greater than about zero volts. The demag signal 406 is the output of the secondary stroke comparator 252 of FIG. 2.

The fourth graph in FIG. 4 shows two signals: Vpeak 408, which relates to the corresponding output of the control block 244 in FIG. 2; and Vcap 410, which relates to the voltage across the timing capacitor 314 of FIG. 3.

The bottom signal in FIG. 4 is Tsample 412 and represents the Tsample output 306 of FIG. 3 that is used to control the switch in the sample and hold circuit.

The power switch of the flyback converter is closed at a time identified with reference 414 in FIG. 4 to start the primary stroke of the flyback converter. The primary current as well as the magnetization current ILmag 404 begins to increase at the start of the primary stroke. The drain voltage Vdrain 414 drops to zero at the start of the primary stroke.

The power switch is later opened at a time shortly before reference 416 in FIG. 4. The drain voltage 402 rises from zero when the power switch is opened and the magnetization current ILmag 404 continues to rise until the drain voltage 402 reaches the input voltage.

When the primary peak current and/or the magnetization current ILmag 404 reach a maximum value, the primary stroke ends and demagnetization begins. This corresponds to the time when the value of Vdrain 402 exceeds the input voltage (Vin) to the flyback converter.

When the value of Vdrain 402 exceeds the sum of Vin and n*Vout (where N is the turns ratio between the primary and secondary windings) then the secondary stroke starts and is identified with reference 416 in FIG. 4. This corresponds to the time at which current starts to flow to the output of the flyback converter. Therefore, there will be a gap between the end of the primary stroke and the start of the secondary stroke.

When the value of Vdrain 402 drops below the sum of Vin and n*Vout, then the secondary stroke ends. This corresponds to the time at which secondary current through the secondary diode drops to zero and is shown with reference 418.

It will be appreciated that these definitions of the primary and secondary strokes are based on energy transfer to and from the transformer.

It can be seen from the demag signal 406 in FIG. 4 that the secondary stroke comparator/detector 252 of FIG. 2 detects a zero crossing (or near-zero crossing) of the feedback voltage Vfb, which corresponds to the time at which Vdrain 402 exceeds Vin. When the demag signal 408 is set, the voltage across the timing capacitor (Vcap 410) starts to linearly increase. The charge across the timing capacitor increases, and Vcap 410 increases until it reaches the threshold/trip level Vpeak 408. At this point, the output of the timing comparator 320 changes and the SR flip-flop/latch 308 is reset. This causes the timing capacitor 314 to be discharged, and the Vcap signal 410 to sharply fall to zero. The Vcap signal 410 will then stay substantially uncharged until the secondary stroke of the next switching cycle.

In some examples Vcap 410 may start to linearly increase during the short pulses in the demag signal 406 that occur during the ringing after the end of the secondary stroke. However, as these demag pulses 406 are short, they are not long enough for Vcap 410 to reach the Vpeak value 408, and therefore Vcap 410 returns to zero before reaching the value of Vpeak 408 and triggering the timing comparator 316 in FIG. 3.

At the crossing of Vcap 410 with the Vpeak value 408, a sample pulse in the Tsample signal 412 occurs. The end of the sample pulse corresponds to the time at which the auxiliary voltage is sensed and is identified with reference 420 in FIG. 4. It can be seen from FIG. 4 that the auxiliary voltage is sensed at a time 420 that is shortly before the end of the secondary stroke 418 as ILmag 404 approaches zero and shortly before the ringing begins in the Vdrain 402 signal.

FIG. 4 illustrates example signals for two switching cycles. It can be seen that the on-time of the power switch for the first switching cycle is longer that the on-time for the second switching cycle. Correspondingly, the level for the peak current ILpeak (the maximum value for ILmag 404) in the transformer is higher for the first switching cycle. Nonetheless, the timing of the pulse in the Tsample signal 412 is automatically adapted such that it occurs shortly before the end of the secondary stroke for each switching cycle. This is achieved by changing the value of Vpeak 408 as shown in FIG. 4.

Vpeak 408 represents the peak value of the primary current, and therefore the delay time of the sample pulse in Tsample 412 with respect to the leading edge in the demag signal 406 is set so that it is proportional to the primary peak current. In other words, the sample moment adapts with the peak current. Therefore, when the peak current decreases as is shown in the switching cycle of FIG. 4, the sample moment shifts to an earlier moment in the switching cycle and the sample pulse will still occur towards the end of the secondary stroke (end of conduction).

The Vpeak signal 408 in FIG. 4 is shown as having a step change between switching cycles for ease of illustration and understanding, in some examples however, the value for Vpeak may change gradually over time as the Icontrol output of the error amplifier 240 in FIG. 2 can be filtered such that the control block 244 sets Vpeak in accordance with a time averaged value of Icontrol.

The components of the circuit can be dimensioned in such a way that the sample moment will be close to the end of the secondary stroke. The duration of the secondary stroke is defined by the secondary inductance (Ls), the secondary peak current (Ips) and the secondary voltage (Vsec) according to the following equation:

$$T_{sec} = L_s \times I_{ps} / V_{sec}$$

The length of time between the start of the secondary stroke and the sampling instant (also referred to as a sampling period) is defined by the magnitude of the current provided to the positive input of the Schmitt trigger 318 in FIG. 3 (Ic), the capacitance of the timing capacitor 314, and the level of the Vpeak signal 304 that is provided to the negative input of the Schmitt trigger 316 according to the following equation:

$$T_{sam} = C \times V_{peak} / I_c$$

Therefore, the size of the components referred to in the above equations can be selected such that the sampling period (Tsam) is shorter than the duration of the secondary stroke (Tsec).

It can be desirable to have a margin between the sampling moment and the end-of-conduction. Such a margin can allow for:
- the tolerance in the values of the DC current source 318 and capacitor 314 in FIG. 3, and the level of the Vpeak signal 304 in FIG. 3;
- a spread of the inductance of the transformer due to tolerances in the windings of the transformer;
- temperature variation, which can affect the performance of the converter; and
- step changes in the load, which can cause a Vout overshoot by cable compensation or by the settling time of the control loop. A Vout overshoot can temporarily cause a shorter secondary stroke.

Improved performance when compared with the prior art can be achieved by starting the timer (Vcap 410) at the end of the primary stroke, when the secondary stroke starts. This moment in time is identified by the demag signal 406. This can be considered as advantageous over starting the timer when the power switch is opened (at the falling edge of the switch driver signal) as accuracy can be increased. The increase in accuracy can be especially noticeable when the primary peak current is small and Vin is high.

Figure 5:
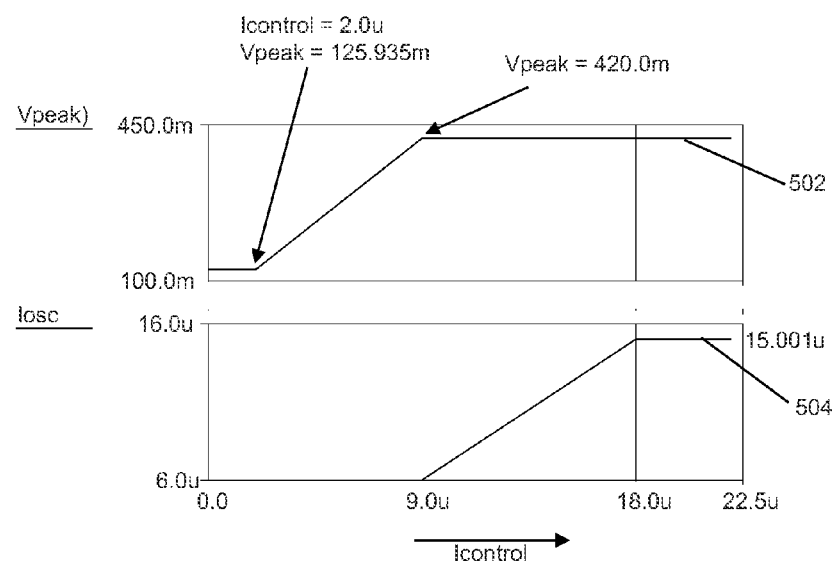
FIG. 5 shows graphically the DC characteristic simulation results of the control block of FIG. 2.

FIG. 5 shows graphically the DC characteristic simulation results of the control block 244 of FIG. 2. FIG. 5 includes a first graph 502 that shows the Vpeak output of the control block 244, and a second graph 504 that shows the Iosc output of the control block 244. The horizontal axis of both graphs in FIG. 5 corresponds to an increasing Icontrol input signal to the control block 244 from left to right in the graphs.

It will be understood from the above description of FIGS. 3 and 4 that the value of Vpeak 502 represents the trip level for the cycle by cycle control of the primary peak current. Vpeak can be considered as representative of the primary peak current.

The parameter Icontrol increases when the output power of the converter is increased. As indicated above, the switching frequency Fosc of the switch control signal is proportional to the output current Iosc, and the on-time of the switch is set according to Vpeak. Starting from the left-hand side of FIG. 5, where Icontrol=0 (no load), the values for Vpeak 502 and Iosc 504 are constant and at a minimum value. Vpeak 502 has a minimum value to ensure that the sample moment does not come so early such that it will occur in the ringing towards the start of the secondary stroke. This ringing in known to occur due to the capacitance at the drain (Cdrain) of the power switch and the leakage inductance of the primary winding (Ls). Sampling during the ringing would lead to inaccurate control of Vout.

As the load increases (and therefore Icontrol increases) from left to right in FIG. 5, the value for Vpeak 502 increases until it reaches 420 mV, at which point Icontrol is at 9 uA. During this increase in Vpeak 502, the value for Iosc 504 remains constant which causes the switching frequency of the switch control signal to also remain constant. The ratio between ILpeak_max and ILpeak_min in this example is 3.3.

As the load increases (and therefore Icontrol increases) beyond 9 uA, the value for Vpeak 502 remains constant and the value for Iosc 504 increases until it reaches 15 uA, at which point Icontrol is at 18 uA.

FIGS. 6, 7 and 8 illustrate graphically the results of a simulation on the circuit of FIG. 2. The simulated circuit is operating in a constant voltage mode with primary peak current control (CVC) mode.

FIG. 6 illustrates the following six waveforms:
- the voltage at the drain of the power switch, Vdrain 602;
- the output voltage, Vout 804;
- the load current drawn from the output of the converter, I(J_Load) 606;
- the magnetization current, I(L_1) 608;
- the Vpeak output of the control block, which is representative of the peak value of the primary current, Vpeak 610;
- the output of the error amplifier, which is the input to the control block, Icontrol 612.

It can be seen from FIG. 6 that when the current drawn by the load 806 is increased, the peak value of the magnetization current 608 increases too.

FIG. 7 provides a detailed view of the signals of FIG. 8 at times when the peak value of the magnetization current, I(L_1) 808 is low. FIG. 7 also shows the voltage at the gate of the switch 716 and the demag signal 714 in the bottom graph of FIG. 7. The sampling pulse is shown with reference 718. The peak value (ILpeak) of I(L_1) 708 in FIG. 7 is 0.108 A, and this ILpeak value requires an adaptive delay of 1.7 us. The adaptive delay is the difference in time between the sample moment and first rising edge of the demag signal 714 for a switching cycle.

$$Td = T\text{sample} - T\text{demag}.$$

Where:
- Td is the adaptive delay:
- Tsample is the time at which the sampling pulse 718 occurs; and
- Tdemag is the time of the first rising edge of the demag signal 714 in a switching cycle.

The level of the magnetization current during the secondary stroke in FIG. 7 is 49 mA (reflected to the primary side) at the moment the sample is taken.

FIG. 8 provides a detailed view of the signals of FIG. 6 at times when the peak value of the magnetization current, I(L_1) 608 is high. The signals shown in FIG. 8 relate to the same properties as those shown in FIG. 7. The peak value (ILpeak) of I(L_1) 808 in FIG. 8 is 0.336 A, and this ILpeak value requires an adaptive delay of 8.3 us. The magnetization current during the secondary stroke is 58 mA (reflected to the primary side) at the moment the sample is taken.

FIG. 9 shows graphically some of the measured waveforms around the switch-off of the power switch. The following waveforms are shown in FIG. 9:
- the voltage at the drain of the power switch—Vdrain 902;
- the voltage across the auxiliary winding—aux-sense 904;
- the current through the primary winding—IL_prim 906; and
- the output voltage—Vout 908.

The delay time 910 between the demag zero-crossing (Vdrain=Vin) and Vgate-off can vary between 200 and 400 ns depending on the value of Vin and the value of Ipeak. It can be seen from FIG. 9 that starting the timer at demag zero-crossing gives accuracy improvement because the timer starts at the start of the secondary stoke when Vdrain 902 exceeds the input voltage 912. When Vdrain 902 exceeds the input voltage plus the reflected output voltage 914, Vout 908 starts increasing and the secondary current starts. Accuracy can be improved because a simpler method of using the gate signal of power switch 112 is not necessary, which would introduce an error in timing: peak between line 906 and increase in line 908.

The difference in time between the sample moment and the expected end of secondary stroke as determined from Vpeak depends on the inductance value of the primary winding of the transformer and the value of the current sense resistor Rs, as the duration of the secondary stroke can be defined according to the following equation:

$$T\text{sec}=Lp \times V\text{peak}/R\text{sense}/(n_p/n_s \cdot V\text{sec})$$

Where:
Tsec is the duration of the secondary stroke;
Lp is the inductance of the primary winding;
Vpeak represents the peak value of the current through the primary winding, and is fed back to the controller according to an embodiment of the invention;
Rsense is the resistance of the sense resistor 230 in FIG. 2;
$n_p$ is the number of turns on the primary winding;
$n_s$ is the number of turns on the primary winding; and
Vsec is the voltage across the secondary winding, which may also be referred to as a secondary voltage.

Therefore, the closeness of the sample moment to the end of the secondary stroke can be varied by adjusting the values for the inductance of the primary winding (Lp) and/or the sense resistor (amongst others) according to the application for which the converter is used, in general, the application will be designed for maximum efficiency with an operation close to the boundary conduction mode for minimum input voltage and the defined sample times will be in the secondary stroke. Also any influence of the tolerances on the primary winding and sense resistor can be taken into account when designing the circuit. In examples where the sense resistor is integrated into the controller IC, only the tolerance of the primary winding may need to be accounted for. In any case, it may not be too difficult to adapt the sample moment with respect to a measured value for Vpeak for a different application.

In some embodiments, an adaptive setting can be added to the timer in order to compensate for the influence of the values for the primary winding and/or sense resistor, introducing such an adaptive setting can enable any deviation from the optimum sample moment to be detected such that the timer can be further adapted in such a way that the optimum sample moment is reached more closely for the next switching cycle.

In order to apply such adaptive settings, the optimum sample moment can be determined for a first switching cycle (N) such that this optimum value can be used to adjust the actual sampling moment for the next switching cycle (N+1).

FIG. 10 shows an example voltage waveform 1002 at an aux winding of a transformer in a flyback converter. The end of the secondary stroke, which is the optimum sampling moment, is identified as Tideal 1004 in FIG. 10.

It can be difficult to detect Tideal 1004 directly, and therefore this embodiment can be used to determine the length of the secondary stroke 1004 from one or more of zero-crossings (which may also be referred to as zero value instants) and/or maxima and minima (which may also be referred to as zero derivative instants) in the ringing of the auxiliary winding voltage 1002 after the end of the secondary stroke. That is, the length of the secondary stroke can be determined using one or more features/timings of the ringing.

One way of identifying Tideal 1004 is to detect two zero crossings in the ringing, for example zero crossings Z1 1006 and Z2 1008. Assuming that the ringing is a pure sinusoid, Tideal can then be determined using:

$$T\text{ideal}=Z1-(Z2-Z1)/2$$

In some practical applications, a peak clamp circuit can be used at the primary side of the transformer to limit the maximum voltage at the switching node. FIG. 11 illustrates an example of such a peak clamp circuit 1102. For cost and for damping reasons, often a low cost slow diode is used as part of the snubber peak clamp. This low cost diode can damp the ringing in the drain voltage and can influence the shape of the ringing, especially at low load.

FIG. 12 illustrates the voltage waveform 1202 at a primary switching node (transformer node 4 of FIG. 11) for a low load situation of a flyback converter that includes a peak clamp circuit with a slow diode. The voltage across the primary switching node has essentially the same shape as the voltage at an auxiliary winding.

It can be seen from FIG. 12 that the shape of the ringing is not sinusoidal. The positive section of the ringing is longer than the negative section of the ringing. Tideal 1204 is once again identified as the optimum sampling moment. Z1 1208 is the first zero crossing in the ringing, Z2 1208 is the second zero crossing in the ringing, and Z3 1210 is the third zero crossing in the ringing. Also identified in FIG. 12 is "Top1" 1212, which represents the first positive turning point in the ringing. Due to the asymmetry in the ringing, use of the above equation (Tideal=Z1−(Z2−Z1)/2) would give a sampling moment that is too late as the voltage would be sensed in the ringing.

However, it can be assumed that the difference between Tideal 1204 and Z1 1206 is approximately equal to the difference between Top1 1212 and Z3 1210 (or the equivalent signal positions for later ringing oscillations). That is, the duration of the positive section of the ringing signal can be considered as consistent throughout the ringing. This assumption can be made due to the basic operation of the snubber.

Another approximation that can be useful is to assume that the difference between Z1 1206 and Tideal 1204 equals (Z3−Z2)/2 (or the equivalent signal positions for later ringing oscillations).

One or more of the above approximations can be used to determine the optimum sampling moment Tideal for a subsequent switching cycle using one of the following equations:

$$T\text{ideal}=Z1-(Z3-Z2)/2$$

$$T\text{ideal}=Z1-(Z3-\text{Top}1)$$

$$T\text{ideal}=Z1-(\text{Top}1-Z2)$$

Once Tideal has been determined, one of two adaptive setting methods can be used to modify the performance of the timer. These two methods can include:
1. Determining the difference between the optimum sample moment (Tideal) and actual sample moment (Tsample) and adding the difference to the timer interval for the next switching cycle. This will be referred to as the summation variant.
2. Determining the ratio between the optimum sample moment (Tideal) and actual sample moment (Tsample) and multiplying a scaling factor to the timer interval for the next switching cycle. This will be referred to as the multiplication variant.

Summation Variant

For embodiments that use the summation variant of the invention, the basic timer relationship: Ttimer=F(Vpeak) can be adapted so that the sampling moment can be made closer to Tideal for the next switching/conversion cycle. In one example, this can involve modifying the threshold with which the demagnetization counter is compared; this unmodified threshold is determined from the received value of Vpeak.

FIG. 13 illustrates an example voltage waveform (VFB) 1302 at the auxiliary winding, and example waveforms that relate to the adaptive timer. The count of the timer is represented by the voltage waveform (Vcap) 1310 at a capacitor (such as capacitor 314 in FIG. 3) that is charged by a constant current during the demagnetization of the transformer. The output sample pulse 1314 is generated for cycle N when the capacitor voltage waveform 1310 timer output crosses a threshold level $Vc_N$ 1316. The period of time between the start of the demagnetization period and the output sample pulse may be referred to as a sampling period or Tsample.

In this embodiment, the output sample pulse 1314 ends at crossing of Vcap 1310 and Vcn 1316 such that a sample switch for Vfb turns to non-conducting and a sample capacitor holds the Vfb voltage when Vcap 1310 crosses Vcn 1316. It will be appreciated that embodiments where a sample pulse 1314 starts at the crossing of Vcap 1310 and Vcn 1316 is a non-limiting implementation for the sampling without the adaptive threshold. Such embodiments are shown in FIG. 3 and FIG. 4.

In this example, the timer is configured to continue counting after the output sample pulse 1314 is generated in order to determine properties of the ringing after expiry of the secondary stroke such that $Vc_N$ can be adjusted for subsequent switching cycles. Such an example may require a modification to the timer of FIG. 3 such that the SR flip-flop 308 is not reset upon generation of the output sample pulse, for example the SR flip-flop 308 could be reset when the power switch is closed to start the primary stroke of the next switching cycle.

As described above, the timer starts counting, and Vcap 1310 starts to linearly increase, from zero when demagnetization is detected at time Z0 1318. The time between the second zero crossing (Z2 1308) of the ringing in VFB 1302 and the first zero crossing (Z1 1306) of the ringing in VFB is represented by a voltage difference in Vcap 1310 at the respective times. To use the notation shown in FIG. 13: Z2−Z1 is proportional to Vz2−Vz1.

In order to determine an adaptive difference for a current switching cycle (cycle N), Tideal is calculated for the previous switching cycle (cycle N−1) using the difference in Vcap 1310 at times Z1 1320 and the instant of the sampling pulse 1316 (in order to determine Vz1−Vcn) for the previous switching cycle (cycle N−1). The difference in Vcap 1310 at times Z2 1322 and Z1 1320 is also determined as Vz2−Vz1 for the previous switching cycle (cycle N−1). An estimation for the adaptive difference for the current switching cycle is then made as:

$$delta_N = Vz1_{N-1} - Vc_{N-1} - (Vz2_{N-1} - Vz1_{N-1})/2$$

This adaptive difference is then added to the timer threshold (which is derived from Vpeak) for the current switching cycle as:

$$Vc_N = k \times Vpeak_N + delta_N$$

Where k represents a constant that is used to set the sensitivity of the control (that is, how close to the end of the secondary stroke the sample is taken). A typical initial sampling moment is a fraction (always below 1) of the secondary stroke time and a typical secondary stroke time is half of the oscillator period time that is often fixed by the design of the controller 110.

In some embodiments, the value for $delta_N$ is set as zero: for the first switching cycle after start-up; when the converter operates in boundary conduction mode without a Vz2 crossing; or when the converter operates in continuous conduction mode without a Vz1 crossing.

FIG. 14 illustrates schematically an example block diagram for implementing the above functionality. Values that relate to a first switching cycle in FIG. 14 carry the identification $X_n$, and values that relate to a second switching cycle with adaption by $delta_n$ carry the identification $X_{n+1}$.

FIG. 14 includes a detector 1402 that is configured to detect all zero-crossings in the FB signal. Detector 1402 can be similar to the detector 252 that is illustrated in FIG. 2.

FIG. 14 also includes a component 1404 that detects the first zero crossing Z0 with a rising FB signal.

The circuit of FIG. 14 includes a calculation component/processor that calculates the value for $Vc_{n+1}$ for the next switching cycle 1408. The $Vc_{n+1}$ signal is applied to a comparator 1418 at a rising edge of the gate signal 1406. Also, $Vc_{n+1}$ is only released to a $delta_n$ calculation component 1412 when it is sampled by sample and hold component 1414, which in turn is controlled when the gate transitions from high to low.

It will be appreciated that the circuit of FIG. 14 could be modified so as to perform any other approximation/adaptation of the threshold value, including:

$$delta_N = Vz1_N - c_N - (Vz3_N - Vz2_N)/2$$

$$delta_N = Vz1_N - Vc_N - Vz3_N - VTop1_N$$

$$delta_N = Vz1_N - Vc_N - VTop1_N - VZ2_N$$

The $delta_n$ definitions that uses the Top1 timing requires a different circuit to that of FIG. 14 that includes a peak detector that detects dVfb/dt=0V after a rising edge.

These embodiments can be particularly advantageous in adapting/compensating for operation in steady state operation, that is when the load current and input voltage of the flyback converter are substantially constant. For example, when the regulation loop in FIG. 14 has settled to a steady value after a transient, which may be caused by a load change.

The summation variant may only partly compensate for transient operation, that is when the load current of the flyback converter is changing and the regulation loop in FIG. 14 is not settled, as the adaptation that is applied is based on absolute values instead of relative values. This is because at given input and output voltages the ratio secondary stroke/primary stroke is fixed, however for a doubling of the peak current, the secondary stroke time also doubles, but if mismatch was compensated by a delta instead of a ratio, the delta should also get doubled, which is not the case. This is the reason why it only partially compensates, but the larger the delta, the more it does not fully compensate.

It will be appreciated that the block diagram of FIG. 14 represents one of many possible circuits that would be available to the skilled person for implementing the desired functionality.

Multiplication Variant

For embodiments that use the multiplication variant, it can be possible to better apply compensation/adaptation during transient operation. With embodiments of this variant, the actual timer interval (Tsample) is compared with the ideal sampling period (Tideal) in a similar way to that described above. However, for the multiplication variant, the sampling moment for the next switching cycle, Ttimer=F(Vpeak) is adapted by multiplying it with an adaptive factor k2 in such a way that a scaling factor is applied. This is in contrast to the summation variant where an adaptive factor is added.

In one embodiment, the multiplication variant can be implemented as follows:

$$T\text{timer} = F(V\text{peak}) \times k2 \times k1$$

Where:

k2 is the ratio between the actual Ttimer and the desired sample moment in relation to Z0 as determined during the previous cycle; and k1 is a scaling factor that is similar to the constant k that is discussed above with reference to the summation variant.

The ideal moment of sampling can be determined using similar equations to those discussed above, for example;

$$V\text{ideal}_N = Z1_N - (Z2_N - Z1_N)/2 \text{ or:}$$

$$V\text{ideal}_N = Z1_N - (Z3_N - Z2_N)/2 \text{ or:}$$

$$V\text{ideal}_N = Z1_N - (Z3_N - \text{Top}1_N) \text{ or:}$$

$$V\text{ideal}_N = Z1_N - (\text{Top}1_N - Z2_N)$$

FIG. 15 shows a block diagram of a circuit according to an embodiment of the invention for implementing the multiplication variant where Videal is determined using the equation Videal=Z1−(Z2−Z1)/2.

The schematic of FIG. 15 includes a first processing block 1502 that is configured to perform the basic function of defining $Vc_N$ as:

$$Vc_N = k1 \times k2 \times V\text{peak}$$

After one switching cycle, k2 has been adapted in accordance with measurements taken during the previous switching cycle and the desired sample moment is reached.

FIG. 15 also includes a second processing block 1504 that is configured to determine the value for k2 for a next switching cycle using values from the current switching cycle as follows:

$$k2_{N+1} = k2_N \times V\text{ideal}/Vc$$

In this way, the second processing block 1504 uses the ratio Videal/Vc that is calculated from the current switching cycle to adapt k2 for the next switching cycle. It will be appreciated that the value for Vc is indicative of the sampling period for the current switching cycle and that Videal is indicative of the determined length of the secondary stroke.

A third processing block 1508 is also included in FIG. 15 and is configured to determine Videal as a function of characteristics/timings of the ringing after the end of the demagnetization period. In this example, Videal is calculated using Z1 and Z2.

One or more of the first, second and third processing blocks 1502, 1504, 1508 may be considered as a threshold setter as it/they contribute to setting the threshold with which the output of a timer is compared.

FIG. 15 includes a shift register that is configured to release the new value for k2 for the next switching cycle from the second processing block 1504 to the first processing block 1502 before the start of the next secondary stroke (for example when a gate signal transitions from high to low).

FIG. 18 shows graphically the voltage waveform Vfb 1802 at an auxiliary winding of the transformer and the waveforms at nodes in the circuit of FIG. 15.

Referring to both FIGS. 15 and 18, a voltage Videal is calculated from the sampled voltage at the capacitor at moments Z1 and Z2. The optimum sampling moment for the next cycle is defined by setting the voltage $Vc_n$. $Vc_n$ is calculated by the block 1502 according to the equation:

$$Vc_n = k1 \times k2y \times V\text{peak}$$

Where:

k2 for the next cycle is scaled with the ratio Videal/Vc by block 1504; and k1 is a constant.

In this way, the system iterates within one cycle to the proper value for Vc.

It will be appreciated that a similar procedure, with additional TOP detectors, as required, can be used for other approximations such as:

$$T\text{ideal} = Z1 - (Z3 - Z2)/2 \text{ or:}$$

$$T\text{ideal} = Z1 - (Z3 - \text{Top}1) \text{ or:}$$

$$T\text{ideal} = Z1 - (\text{Top}1 - Z2)$$

FIG. 17 illustrates an embodiment for implementing the approximation Tideal=Z1−(Z3−Z2)/2.

It will be appreciated that the block diagram of FIGS. 15 and 17 represent non-limiting example circuits that would be available to the skilled person for implementing the desired functionality.

Embodiments of the invention can be applied in any switch mode power supply (SMPS), such as an SMPS with mains isolation, especially when there is a reason to avoid use of an opto-coupler for output voltage regulation. An example is the use in low power adapters with requirements for low cost and low no-load power levels.

Embodiments disclosed herein can avoid requiring a digital implementation that takes samples of the aux voltage at regular small timing intervals, and subsequently detecting which sample is the best to use. Such an implementation can be complex as the sensing interval should be chosen carefully, and the high clock frequency that is needed for the regular sampling consumes power.

Embodiments disclosed herein can also be considered advantageous when compared with systems that use a fixed sampling moment, for example 2 used after the start of the secondary stroke.

There may be provided a switch mode power supply controller (SMPS) for regulating the output voltage of the converter in response to a feedback signal from a winding of a magnetic energy storage device forming part of the input circuitry of the SMPS. The SMPS controller may comprise a timer for defining a desired timer counting value in order to define a specific moment during the secondary stroke. The counting speed of the timer may be made fixed. The setting for the desired counting value may be dependent on the setting of the peak value of the current in the magnetic energy storage device. The SMPS controller may also include means for sampling the voltage at the feedback signal from a winding of a magnetic energy storage device at the moment that the timer reaches the counter value.

The timer may be started at the zero crossing of the signal from a winding of a magnetic energy storage device.

The peak value of the current in the magnetic energy storage device may be represented by the voltage across a current sensing resistor.

The converter may be a flyback converter or a buck converter.

The switch mode power supply controller may further include: means for adapting a desired counting threshold value cycle-by-cycle in order to iteratively improve the delay between the start of the secondary stroke and the instant that the output voltage is sampled. This adaptation delays the sampling moment to the end of the secondary stroke for a more accurate output voltage.

One or more embodiments disclosed herein can improve the accuracy of output voltage sensing via an auxiliary winding. Such inaccuracies may be due to, for example, forward voltage of the secondary diode, ESR of output capacitor, copper resistance of transformer, series resistance between transformer and output capacitor, and transformer leakage inductances.

Embodiments of the invention can allow accurate sensing of the output voltage at the primary side, in normal load conditions and for operation at no-load with low input power. Embodiments can also use a low/minimum supply current.

Embodiments of the invention can include one or more of:

A switched mode power converter where energy is stored in an inductor or transformer during the primary stroke and transferred to the output during the secondary stroke;

A method that uses a timer with an adaptive delay time that is proportional to a variable that is related to the primary transformer peak current. The timer determines the sample moment of the voltage at an aux winding as representation of the output voltage of the converter, where the sample moment is close to but always before the end of the secondary stroke;

An adaptive delay time is referred to the zero crossing of the feedback signal at the end of the primary stroke which gives a better accuracy of the sample moment and therefore also a better accuracy of the sensed voltage at normal load and in particular at low power in no-load. The adaptive delay time starts after the rise time of the drain voltage, this time is not part of the secondary stroke and can be significant at low current levels as is the case in no-load operation.

An additional adaptive compensation method where for the Nth conversion cycle the difference (or ratio) is sensed between the sample moment as determined by the timer and the actual end of the secondary stroke at the moment that is determined by the transformer magnetizing current crossing zero. This difference (or ratio) in time is then used during the Nth+1 conversion cycle to set a sample moment closer to the actual moment that is determined by the transformer magnetizing current crossing 0.

A simple implementation of the sense and sampling function without offset and interference problems and with minimum silicon area

The invention claimed is:

1. A controller for a switched mode power supply, the switched mode power supply comprising one or more windings, the controller comprising:

a fixed speed timer;

a threshold setter configured to a set a threshold for the timer in accordance with a peak value of a current through one of the one or more windings;

a secondary stroke detector configured to start the fixed speed timer upon detection of the start of a secondary stroke of the switched mode power supply;

a sampler configured to sample a voltage across one of the one or more windings when a count of the fixed speed timer reaches the threshold.

2. The controller of claim 1, wherein the secondary stroke detector is configured to start the fixed speed timer in response to detection of the power switch of the switched mode power supply being turned off.

3. The controller of claim 1 further configured to:

determine the length of the secondary stroke;

determine a sampling moment as the instant that the sampler samples the voltage across the winding when the threshold is reached;

wherein the threshold setter is configured to modify the threshold for use in a subsequent switching cycle of the switched mode power supply in accordance with the sampling moment and the length of the secondary stroke.

4. The controller of claim 3, further configured to determine the length of the secondary stroke using one or more features of ringing in a voltage at the winding that follows a demagnetization period.

5. The controller of claim 4, further configured to identify instants in time when a derivative of the voltage across the winding with respect to time is zero, and determine the end of the secondary stroke using the identified instants in time.

6. The controller of claim 4, further configured to identify instants in time when the voltage at the winding crosses zero, and determine the end of the secondary stroke using the identified instants in time.

7. The controller of claim 3, further configured to modify the threshold for use in a subsequent switching cycle in accordance with the ratio between the length of the secondary stroke and the time between start of secondary stroke and the sampling moment.

8. The controller of claim 3, further configured to modify the threshold for use in a subsequent switching cycle in accordance with the difference between the length of the secondary stroke and the time between start of secondary stroke and the sampling moment.

9. The controller claim 1, wherein the secondary stroke detector is configured to compare a signal representative of a voltage across the winding with a secondary stroke threshold voltage in order to detect the start of a demagnetization period.

10. The controller of claim 9, wherein the secondary stroke threshold is about zero volts.

11. The controller of claim 1 further configured to control operation of a switch of the switched mode power supply in accordance with the sampled voltage.

12. The controller of claim 1, wherein the switched mode power supply is a flyback converter having a transformer, the threshold setter is configured to a set the threshold for the timer in accordance with a peak value of a current through the primary winding, and the sampler is configured to sample a voltage across an auxiliary winding when the count of the fixed speed timer reaches the threshold.

13. A switched mode power supply comprising the controller of claim 1.

14. A method of sampling a voltage across a winding in a switched mode power supply, the method comprising:

setting a threshold in accordance with a peak value of a current through a winding of the switched mode power supply;

detecting the start of a secondary stroke of the switched mode power supply;

starting a fixed speed timer upon detection of the start of the secondary stroke; and sampling a voltage across the winding when a count of the timer reaches the threshold.

15. The method of claim 14, further comprising controlling an operation of a switch of the switched mode power supply in accordance with the sampled voltage.

* * * * *